(12) United States Patent
Do et al.

(10) Patent No.: US 7,146,449 B2
(45) Date of Patent: Dec. 5, 2006

(54) BLUETOOTH ASSOCIATION WITH SIMPLE POWER CONNECTION

(75) Inventors: Phuc Ky Do, Morrisville, NC (US); Justin Monroe Pierce, Cary, NC (US); Ramon A. Reveron, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 11/020,958

(22) Filed: Dec. 22, 2004

(65) Prior Publication Data

US 2006/0136647 A1    Jun. 22, 2006

(51) Int. Cl.
*G06F 13/00* (2006.01)

(52) U.S. Cl. .................. 710/303; 710/304; 710/300; 361/686

(58) Field of Classification Search ........ 710/300–304; 361/686
See application file for complete search history.

(56) References Cited

U.S. PATENT DOCUMENTS

| | | | |
|---|---|---|---|
| 5,899,931 A | 5/1999 | Takiguchi et al. | |
| 6,452,910 B1 | 9/2002 | Vij et al. | |
| 6,487,180 B1 | 11/2002 | Borgstahl et al. | |
| 6,542,717 B1 | 4/2003 | Zimmerman et al. | |
| 6,745,038 B1 | 6/2004 | Callaway et al. | |
| 2002/0161999 A1 | 10/2002 | Gunter et al. | |
| 2003/0020629 A1 | 1/2003 | Swartz et al. | |
| 2005/0017946 A1* | 1/2005 | Park ......................... | 345/156 |

* cited by examiner

*Primary Examiner*—Rehana Perveen
*Assistant Examiner*—Clifford Knoll
(74) *Attorney, Agent, or Firm*—Mark E. McBurney; Dillon & Yudell LLP

(57) ABSTRACT

A method and system for wirelessly coupling a computer with a peripheral device. The peripheral device is initially docked to a docking port in the computer. The computer then listens for identifiers from all peripheral devices within range of the computer, including the identifier for the peripheral device that is presently docked with the computer. The computer then instructs the docked peripheral device to stop sending its identifier. By a process of deduction, the computer is able to identify the docked peripheral device. The step of stopping the docked peripheral device from sending the peripheral device's identifier is preferably controlled by monitoring whether the computer is charging a battery in the docked peripheral device. Thus, the docked peripheral device transmits its identifier only when it is charging its battery.

19 Claims, 6 Drawing Sheets

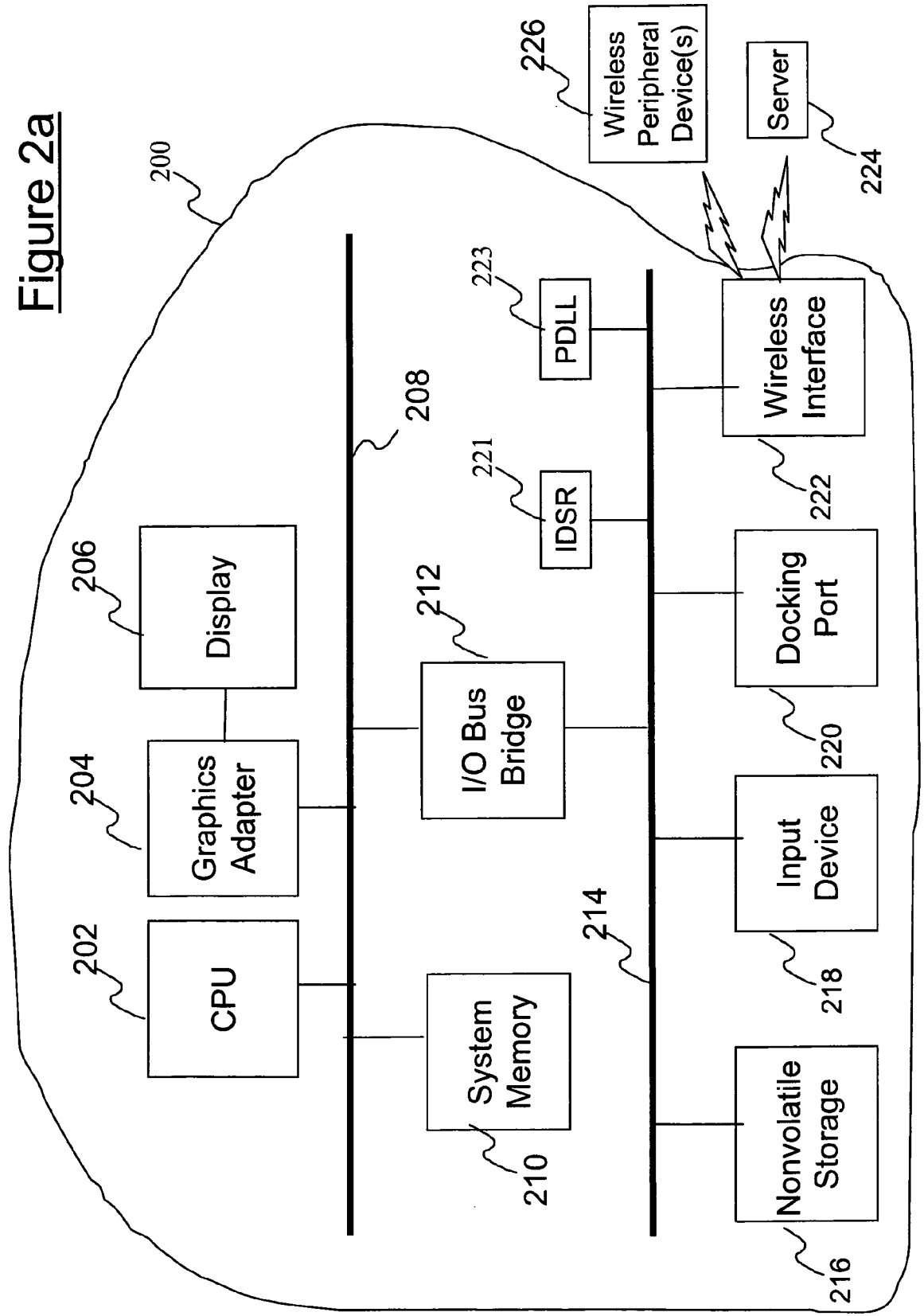

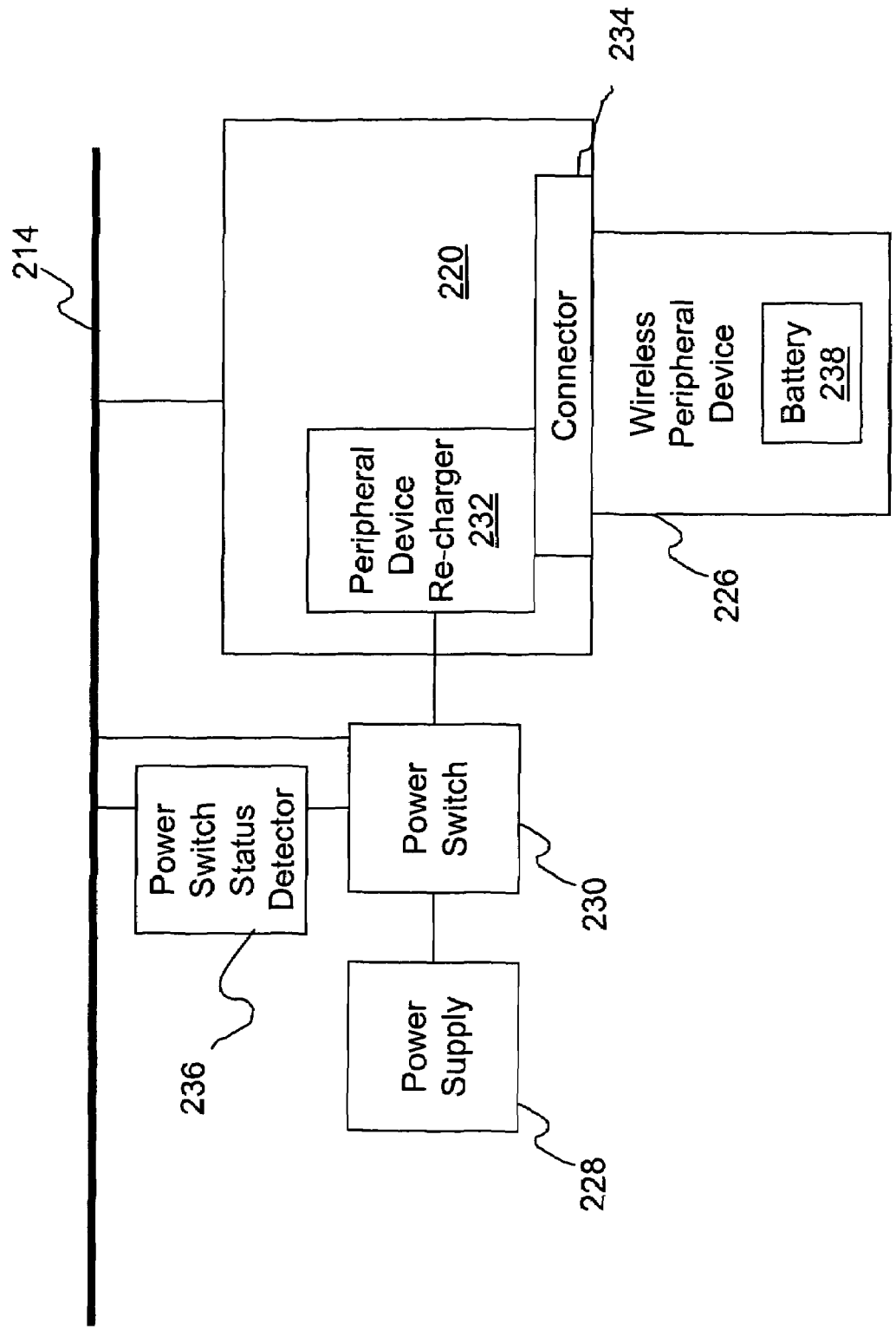

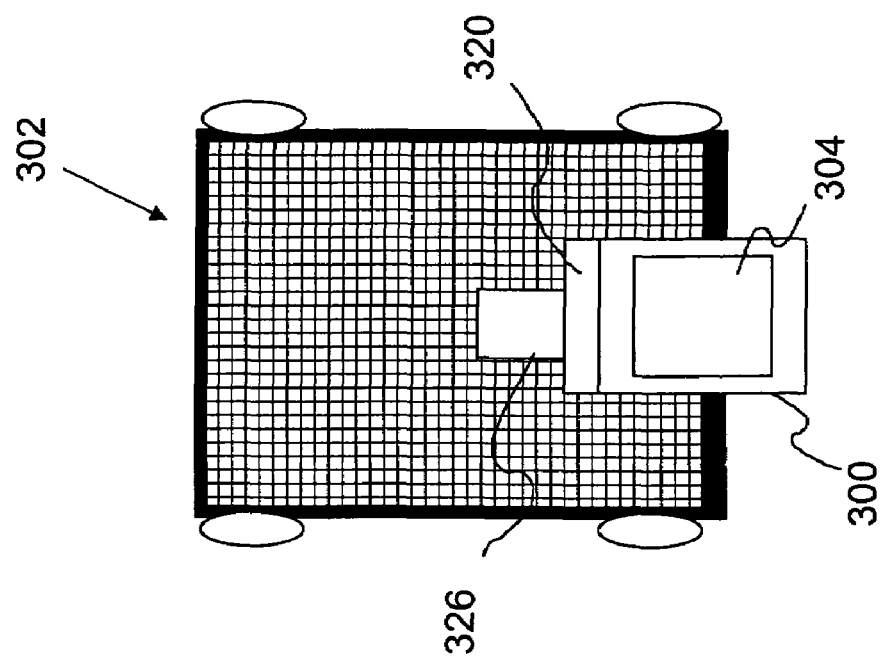
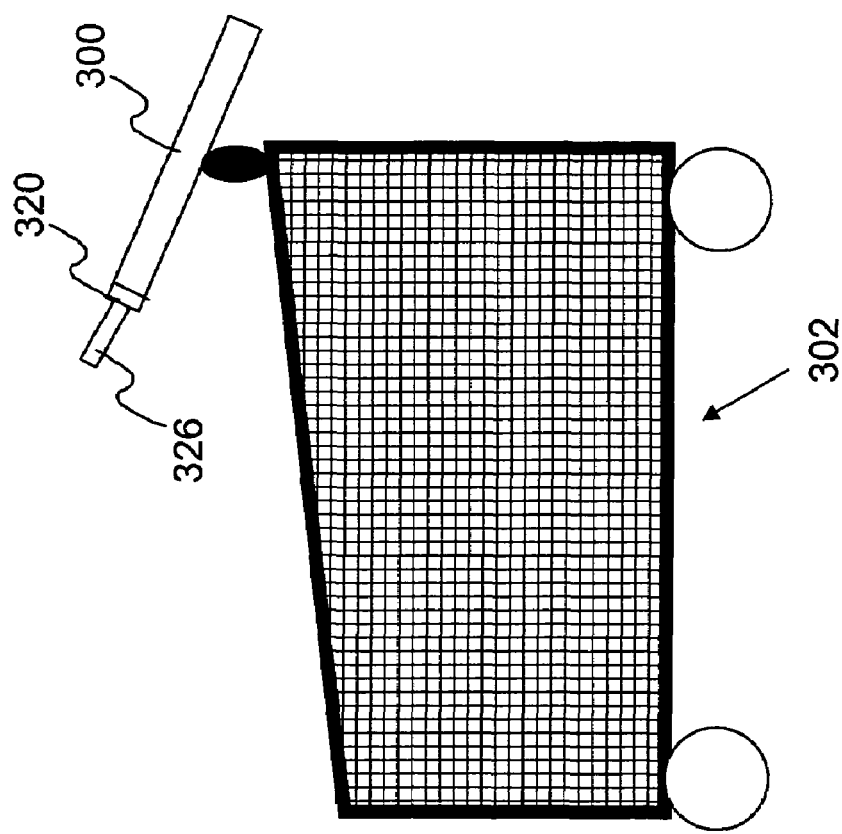
Figure 3b
Figure 3a

BLUETOOTH ASSOCIATION WITH SIMPLE POWER CONNECTION

BACKGROUND OF THE INVENTION

1. Technical Field

The present invention relates in general to the field of computers, and in particular to computers having wireless peripheral devices. Still more particularly, the present invention relates to a method and system for logically coupling a specific wireless peripheral device to a computer.

2. Description of the Related Art

In an effort to make connections physically and aesthetically neater, many computer systems use wireless interfaces with peripheral devices. One popular wireless interface is known as Bluetooth®. The Bluetooth® specification is described in the "Specification of the Bluetooth System," published 05 Nov. 2003 by Bluetooth SIG, which is herein incorporated by reference in its entirety.

Bluetooth® employs a physical radio channel, which is shared by a group of devices that are synchronized to a common clock and frequency hopping pattern. A first device, typically a computer (desktop, laptop, tablet, Personal Digital Assistant—PDA, et al.) provides a synchronization reference, and is known as a master. All other devices (peripherals, other computers, et al.) are known as slaves. The master and slave together form a closely proximate (usually less than 10 meters apart) network known as a piconet, which permits radio communication between each slave and the master (but not between slaves).

To establish a radio link between the master and a slave, the master interrogates any slave that is close enough to "hear" an interrogation signal from the master. The slave responds with its Media Access Control (MAC) address, which identifies the slave. The user of the master computer then manually selects which available slave to connect to the master. For example, FIG. 1 illustrates a Graphical User Interface (GUI) 100 showing icons for a printer, a keyboard and a mouse, all of which are Bluetooth® enabled and are available to (and within range of) the master. The user then double clicks the icon of each wireless peripheral device that she wishes to wirelessly couple for communication with the master (computer).

Such a system as shown in FIG. 1 is adequate if the only Bluetooth® peripheral devices within radio range of the master computer are those peripheral devices that "belong" with the master computer. However, a problem arises if the master computer receives responses from Bluetooth® enabled devices that are associated with another master computer, particularly if an automatic connection system is used. Furthermore, manual, static association (the common method for establishing Master/Slave relationship) of only selected devices (such as described in FIG. 1) is not desirable since it is cumbersome and user error-prone, since the user may not know which icon described peripheral devices "belong" to her computer. Such available wireless devices may be in any common proximate area, such as an adjoining cubicle, or as contemplated in a preferred embodiment of the present invention, in a public retail establishment.

What is needed, therefore, is a method and system that selectively logically links an authorized Bluetooth® enabled peripheral device with an appropriate master computer. Preferably, such a method and system will require minimal user intervention. In particular, what is needed is a method and system that can be used in environments in which Bluetooth® enabled devices can be interchanged and the master/slave relationship can be re-established simply and quickly.

SUMMARY OF THE INVENTION

The present invention is thus directed to a method and system for wirelessly coupling a computer with a peripheral device. The peripheral device is initially docked to a docking port in the computer. Detecting the docking event, the computer then listens for identifiers from all peripheral devices within range of the computer, including the identifier for the peripheral device that is presently docked with the computer. The computer then instructs the docked peripheral device to stop sending its identifier. By a process of deduction, the computer is able to identify the docked peripheral device. In a preferred embodiment, the docked peripheral device subsequently is wirelessly associated only with the computer to which that peripheral device was initially docked.

The step of stopping the docked peripheral device from sending the peripheral device's identifier is preferably controlled by monitoring whether the computer is charging a battery in the docked peripheral device. Thus, the docked peripheral device transmits its identifier only when it is charging its battery. Alternatively, a simple powering sequence or simple secondary communication can be used to inform the docked peripheral device to transmit its identifier.

The present invention thus allows Bluetooth® enabled devices to be interchanged among master computers, and the master/slave relationships between computers and peripheral devices can be established and re-established simply and quickly.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2a illustrates an exemplary computer system in which the present invention can be implemented;

FIG. 2b depicts additional detail of a docking port in an exemplary master computer system;

FIGS. 3a–b depict an authorized peripheral device docked to the exemplary master computer, with the exemplary computer being mounted on a shopping cart;

DETAILED DESCRIPTION OF THE PREFERRED EMBODIMENT

Figure 1:
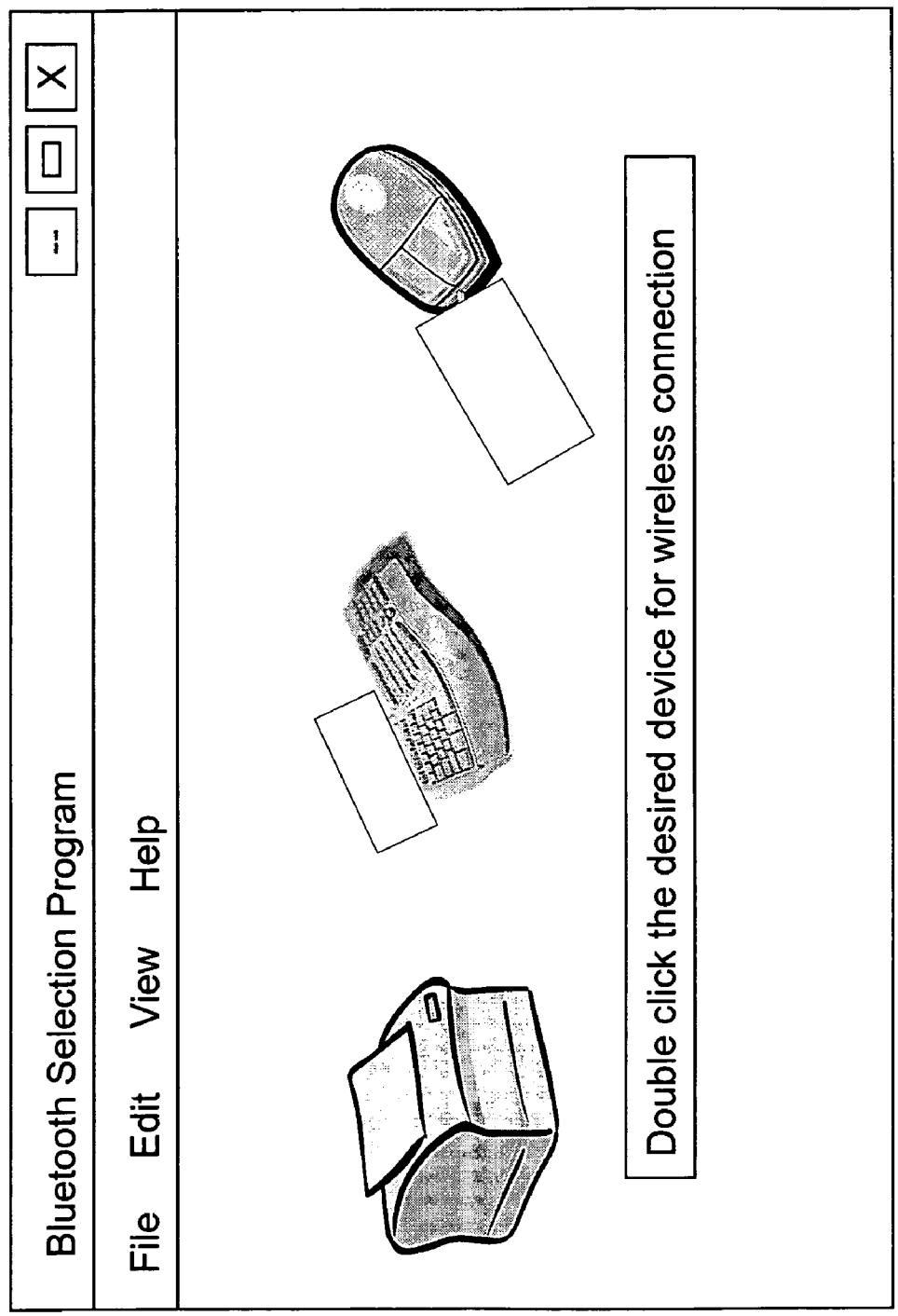
FIG. 1 depicts a prior art Graphical User Interface (GUI) used to manually couple wireless peripheral devices to a computer.

With reference now to FIG. 2, there is depicted a block diagram of a data processing system in which a preferred embodiment of the present invention may be implemented. Data processing system 200 represents an exemplary hardware configuration of a target platform. Data processing system 200 may be, for example, one of the models of personal (e.g., tablet) computers (or, as described below, a server) available from International Business Machines Corporation of Armonk, N.Y. Data processing system 200 includes a central processing unit (CPU) 202, which is connected to a system bus 208. In the exemplary embodiment, data processing system 200 includes a graphics adapter 204 also connected to system bus 208, for providing user interface information to a display 206.

Also connected to system bus 208 are a system memory 210 and an input/output (I/O) bus bridge 212. I/O bus bridge 212 couples an I/O bus 214 to system bus 208, relaying and/or transforming data transactions from one bus to the other. Peripheral devices such as nonvolatile storage 216, which may be a hard disk drive, and input device 218, which may include a conventional mouse, a trackball, or the like, is connected to I/O bus 214.

Data processing system 200 also includes a docking port 220, about which additional detail and discussion are given below in FIG. 2b, and a wireless interface 222. Wireless interface 222 is an interface that permits data processing system 200 to wirelessly communicate with another data processing system, such as a server 224, as well as one or more wireless peripheral devices 226.

Data processing system 200 also includes an IDentification Signal Receiver (IDSR) 221. IDSR 221 is a logic (hardware and/or software) that uses wireless interface 222 to receive an identification signal from wireless peripheral devices 226, as described in detail below.

Also included in data processing system 200 is a Peripheral Device Locking Logic (PDLL) 223. PDLL 223 uses an identifier received by IDSR 221 from a specific wireless peripheral device 226 to establish a wireless link between data process system 200 and the specific wireless peripheral device 226, as described in further detail below. That is, PDLL 223 is capable of 1) turning a power switch 230 (shown below in FIG. 2b) off and on, 2) starting and stopping a transmission of an identifier from a docked wireless peripheral device 226, 3) identifying which wireless peripheral device 226 is currently docked to docking port 220 using a first and second list of identifiers from IDSR 221, and 4) establishing an exclusive wireless communication link between a specific wireless peripheral device 226 and the data processing system 200.

The exemplary embodiment shown in FIG. 2a is provided solely for the purposes of explaining the invention and those skilled in the art will recognize that numerous variations are possible, both in form and function. For instance, data processing system 200 might also include a compact disk read-only memory (CD-ROM) or digital versatile disk (DVD) drive, a sound card and audio speakers, and numerous other optional components. All such variations are believed to be within the spirit and scope of the present invention. The data processing system 200 is illustrated to describe a preferred embodiment of a Bluetooth® enabled master computer, to which one or more Bluetooth® enabled peripheral devices are initially docked and subsequently wirelessly connected. Furthermore, the computer architecture generally described for data processing system 200 is also appropriate for use in constructing server 224, except that server 224 preferably does not require an IDSR 221 or a PDLL 223, since in the preferred embodiment of the present invention the function of identifying and wireless connecting the master computer to authorized peripheral devices is performed by the master computer to which the specified peripheral is initially docked, as described below.

Referring now to FIG. 2b, additional detail is given for docking port 220 and associated power. A power supply 228, preferably within an enclosure (not shown) for data processing system 200, is coupled to a power switch 230, which electrically couples power supply 228 to a peripheral device re-charger 232 in docking port 220. When wireless peripheral device 226 docks with docking port 220 via a connector 234, wireless peripheral device 226 is able to recharge a battery 238 that is inside (or otherwise coupled to) wireless peripheral device 226. Note that connector 234 provides wireless peripheral device 226 with both a power connection to peripheral device re-charger 232 as well as a data connection to I/O bus 214.

The position of power switch 230 (either closed to electrically connect power supply 228 with peripheral device re-charger 232 or open to break the connection) is detected by a power switch status detector 236, which sends a logic signal to I/O bus 214 indicating whether power is being sent to peripheral device re-charger 232 (and thus resulting in the battery 238 in wireless peripheral device 226 being in the process of being charged). Concurrently, wireless peripheral device 226 is able to send a signal to I/O bus 214 informing data processing system 200 (the master Bluetooth® computer) that the wireless peripheral device 226 is coupled to docking port 220 and is charging (or at least capable of charging) battery 238. That is, for the purposes of the logic described in the present invention, the master Bluetooth® computer can assume that battery 238 is being charged whenever wireless peripheral device 226 is docked (via connector 234) to docking port 220 and power switch 230 is closed, even if battery 238 is not actually being charged (due to being fully charged, being defective, being removed from wireless peripheral device 226, etc.).

Referring now to FIGS. 3a–b, an exemplary use of data processing system 200 is shown. Data processing system 200 is depicted as a tablet computer 300, which is master Bluetooth® enabled computing device that is attached to a shopping cart 302, preferably in a manner that is semi-fixed (i.e., requiring tools to remove tablet computer 300 from shopping cart 302, in order to prevent theft of tablet computer 300). Peripheral device 226 is depicted as a scanner 326, which is docked to tablet computer 300 via a docking port 320. As seen in the top view of FIG. 3b, tablet computer 300 has an active viewing screen 304, which displays a Graphical User Interface (GUI) for displaying data, as well as for receiving inputs (preferably via a touch-screen capability) into tablet computer 300.

An exemplary use of tablet computer 300 may be in a retail establishment. As a shopper places items into shopping cart 302, the shopper removes the hand-held wireless scanner 326 from docking port 320, and uses the scanner 326 to read a Universal Product Code (UPC) barcode on the item. The tablet computer 300 stores all items that have been scanned and placed in the shopping cart 302 into a list. When the customer checks out, the checker simply downloads the list (with prices) to conclude a shopping transaction. While this example of the use of data processing system 200 (e.g., tablet computer 300) should be considered useful in understanding an exemplary environment in which the present invention operates, it is understood that the scope of the claims is to extend to all environments in which there is a need to logically associate a specific wireless peripheral device to a data processing system.

Figure 4:
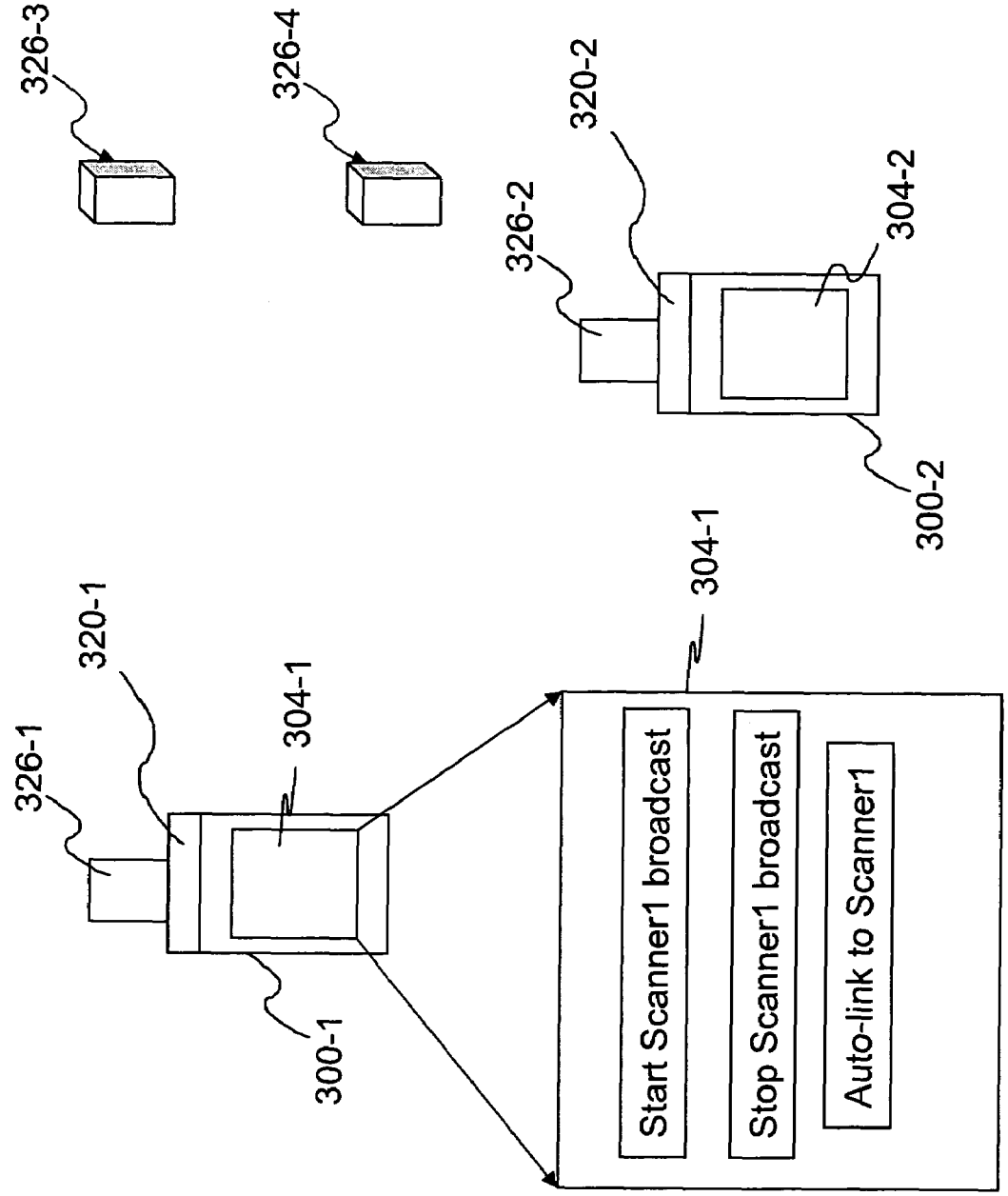
FIG. 4 illustrates the exemplary master computer with the docked peripheral device, as well as other peripheral devices that are not authorized to communicate with the master computer that is docked with the authorized peripheral device.

Referring now to FIG. 4, there is illustrated an environment in which multiple wireless peripheral devices are within wireless range of a specific tablet computer 300-1. However, the only scanner that is intended to communicate with tablet computer 300-1 is scanner 326-1, which is shown as coupled to tablet computer 300 via docking port 320-1, but which will be capable of exclusive wireless communication with tablet computer 300-1 when removed from docking port 320-1. Thus, it would be problematic for tablet computer 300 to be in wireless communication with other peripheral devices such as scanners 326-2,3,4, whether or not these scanners are currently docked to a tablet computer 300. That is, tablet computer 300 should not be able to wirelessly communicate with scanners 326-3,4 (undocked) or scanner 326-2 (currently docked to tablet computer 300-2), but should be able to wirelessly communicate with only scanner 326-1. This exclusive communication between tablet computer 300-1 and scanner 326-1 is accomplished by the present invention as described herein.

Figure 5:
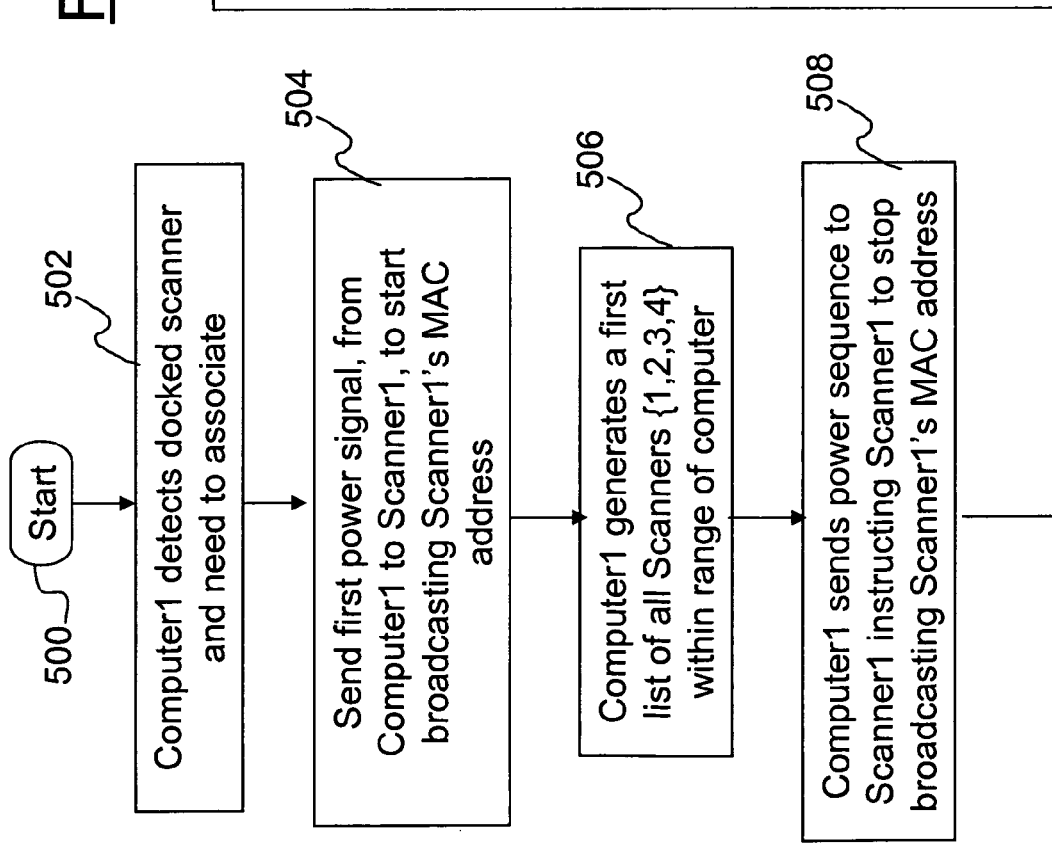
FIG. 5 is a flow chart of steps taken in a preferred embodiment of the present invention.

To ensure that scanner 326-1 is the only scanner that can wirelessly communicate with tablet computer 300-1 (such wireless communication preferably being enabled by the Bluetooth® standard incorporated by reference above), the present invention follows the exemplary steps shown in FIG. 5. Referring therefore to FIG. 5, after initiator block 500, Computer1 detects a docked Scanner1 and determines that Computer1 needs to be associated (auto-linked) with Scanner1 (block 502). Next, tablet Computer1 (300-1) sends power to a peripheral device re-charger (such as peripheral device re-charger 232 shown in FIG. 2b), as described in block 504. This power is sent by switching on (closing) power switch 230, which switching is detected by power switch status detector 236 (see FIG. 2b). When power switch 230 is closed (power is sent to peripheral device re-charger 232), two events occur. One event is that battery 236 starts charging. Another event is that power switch status detector 236 lets CPU 202, or else another dedicated logic (not shown), send to Scanner1 (326-1) a signal, via docking port 220, that instructs Scanner1 (326-1) to start broadcasting Scanner1's (326-1) Media Access Control (MAC) address along with the rest of Scanner1's Bluetooth® registration information.

Besides receiving the MAC address and other Bluetooth® registration information from Scanner1, Computer1 is also receiving this same information from all other scanners within range (e.g., scanners 326-2,3,4 shown in FIG. 4), preferably using the IDSR 221 shown in FIG. 2a. Computer1 uses this information to generate a first list identifying all scanners currently within range (block 506). This list thus includes identifiers for scanners 326-1,2,3,4 (shown as the set of {1,2,3,4}).

Next, Computer1 sends a power sequence to Scanner1, which causes Scanner1 to stop broadcasting its own physical address (MAC address) and other Bluetooth® registration information (block 508). This power sequence is preferably an instruction to open power switch 230, thus turning off power to peripheral device re-charger 232 (see FIG. 2b). Alternatively, this power sequence may be any variation in power being supplied to peripheral device re-charger 232. In another alternative embodiment, this power sequence may be a signal to Scanner1 to stop recharging its battery (i.e., battery 236 shown in FIG. 2b), through the use of logic within Scanner1 (not shown in FIG. 2b), even though power may still be available to peripheral device re-charger 232 (i.e., power switch 230 is closed).

Once Scanner1 stops sending its own identification signal, then Computer1 generates of second list of identifiers for all Scanners within range that are still broadcasting their identification information (block 510). With reference again to FIG. 2b, then, Scanners2–4 (326-2,3,4) are now listed in the second list (shown as the set {2,3,4}).

Computer1 then deduces, preferably using the PDLL 223 shown in FIG. 2a, which scanner is the docked Scanner1 by subtracting the second list from the first list. That is, the first set (list) containing {1,2,3,4} minus the second set (list) containing {2,3,4} equals the single element set containing {1}. Thus, by deduction, Computer1 knows that Scanner1 is coupled to Computer1 (block 512). Computer1 then automatically establishes an exclusive Bluetooth® wireless link with Scanner1 (block 514), preferably using the PDLL 223 illustrated in FIG. 2a. That is, code and logic (preferably CPU 202) in Computer1 automatically establish an exclusive link between Computer1 and Scanner1 such that Scanner1 can only communicate with Computer1, and the process ends (terminator block 516). Now that Scanner1 is exclusively linked with Computer1, Scanner1 can wirelessly communicate only with Computer1, whether Scanner1 is docked or undocked with Computer1.

Note that the steps described above for receiving from the IDSR the first list of all peripheral devices within range of the IDSR, stopping the transmission of the IDentification (ID) signal form the docked peripheral device, and the subsequent receiving of the second list of peripheral devices within range of the IDSR, such that a determination can be made as to which peripheral device was docked to the master computer, are preferably performed by PDLL 223 described above.

If additional peripheral devices are to be exclusively wirelessly linked to a specific data processing system 200 (such as but not limited to a tablet computer such as table computer 300), then the steps shown in FIG. 5 are reiterated for each desired peripheral device.

Note that there may be occasions in which more than one device may stop transmitting its identification number, as would occur when two computers are attempting to automatically link with different scanners at the same time. For example, consider the set {1, 2, 3, 4} described above. Assume that {1} identifies the Scanner1 that is to be auto-linked with Computer1 as described in FIG. 5. However, now assume that {2} identifies a Scanner2 (not shown) that is to be auto-linked with a Computer2 (also not shown). If Computer2 uses the present invention at the same time as Computer1, then the remaining set shown in block 510 would include only {3, 4}. Thus, Computer1 would become confused since two scanners (Scanner1 and Scanner2) appear to want to auto-link with Computer1. When this rare situation occurs, the Computer1 waits a predetermined (or random) "backoff period" before attempting to associate again with Scanner1. That is, Computer1 waits a certain amount of time to allow Computer2 to auto-link with Scanner2 (using the above described steps), and then Computer1 auto-links with Scanner1 as described above.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The present invention thus provides a simple method and system for dynamically wirelessly coupling a computer to a wireless peripheral device. Preferably, the steps of instructing Scanner1 to start and stop broadcasting its identification information are initiated by inputting these commands onto active viewing screen 304-1, as seen in the magnified view of active viewing screen 304-1 shown in FIG. 4. Furthermore, the step of deducing which peripheral device is Scanner1 and auto-linking it to Computer1 may be accomplished automatically or by clicking (by stylus pen or touch-screen) the appropriate instruction shown in FIG. 4 on active viewing screen 304-1.

While the invention has been particularly shown and described with reference to a preferred embodiment, it will be understood by those skilled in the art that various changes in form and detail may be made therein without departing from the spirit and scope of the invention. For example, while detection of the charging status of battery 238 has been through the use of power switch status detector 236, any simple signaling mechanism may be used to indicate that battery 238 is being charged via docking port 220.

What is claimed is:

1. A system comprising:
    a wireless peripheral device; and
    a computer system composed of:
        a power supply;
        a docking station;
        a power switch that couples the power supply to the docking station;
        an IDentification Signal Receiver (IDSR); and
        a Peripheral Device Locking Logic (PDLL), wherein the wireless peripheral device is a docked peripheral device that is docked in the docking station, and wherein the PDLL initializes communication only with the docked peripheral device,
    wherein the PDLL includes logic to:
        receive from the IDSR a first list of all peripheral devices within range of the IDSR,
        stop a transmission of an IDentification (ID) signal from the docked peripheral device, and
        subsequently receive from the IDSR a second list of peripheral devices within range of the IDSR, wherein the second list of peripheral devices excludes the ID signal from the docked peripheral device, wherein the PDLL determines the ID of the docked peripheral by contrasting the first and second lists.

2. The computer system of claim 1, wherein the power supply provides a battery recharging supply to a battery in the peripheral device that is docked in the docking station, and wherein the transmission of the ID signal from the docked peripheral device is stopped in response to the power switch turning off the battery recharging supply to the docking station.

3. The computer system of claim 2, further comprising:
    a switch sensor associated with the power switch, wherein the switch sensor signals whether or not the battery recharging supply is coupled to the docking station.

4. The computer system of claim 3, wherein the peripheral device is capable of communicating with the computer system using a short-range wireless communication system.

5. The computer system of claim 4, wherein the short-range wireless communication system is a Bluetooth® system.

6. The computer system of claim 2, wherein the PDLL includes a subtraction logic that logically subtracts the contents of the second list from the contents of the first list.

7. A method comprising:
    docking a wireless peripheral device to a computer;
    sending a first signal to the docked wireless peripheral device to transmit a docked device identification signal from the docked wireless peripheral device;
    receiving, at the computer, identification signals from all peripheral devices within range of the computer;
    generating a first list of all of the peripheral devices based on the received identification signals;
    sending a second signal to the docked wireless device to cease transmitting the docked wireless device's identification signal;
    receiving, at the computer, identification signals from remaining peripheral devices that do not include the docked peripheral device;
    generating a second list of the remaining peripheral devices;
    deducing that the identifier for the docked wireless peripheral device is an identifier found in the first list but missing in the second list; and
    subsequently establishing an exclusive wireless connection with the docked wireless peripheral device whose identity was deduced in the deducing step.

8. The method of claim 7, wherein the transmission of the identification signal from the docked peripheral device is stopped in response to a turning off of a power to a battery re-charger for a battery in the docked peripheral device.

9. The method of claim 7, wherein the peripheral device is capable of communicating with the computer system using a short-range wireless communication system.

10. The method of claim 7, wherein the short-range wireless communication system is a Bluetooth® system.

11. The method of claim 7, wherein the deducing step is performed by logically subtracting the contents of the second list from the contents of the first list.

12. The method of claim 7, wherein the computer system is a tablet computer mounted on a shopping cart.

13. The method of claim 12, wherein the peripheral device is a scanner.

14. A computer program product, residing on a computer usable medium and capable of being executed on a computer, comprising:
    program code for docking a wireless peripheral device to a computer;
    program code for sending a first signal to the docked wireless peripheral device to transmit a docked device identification signal from the docked wireless peripheral device;
    program code for receiving, at the computer, identification signals from all peripheral devices within range of the computer;
    program code for generating a first list of all of the peripheral devices based on the received identification signals;
    program code for sending a second signal to the docked wireless device to cease transmitting the docked wireless device's identification signal;

program code for receiving, at the computer, identification signals from remaining peripheral devices that do not include the docked peripheral device;

program code for generating a second list of the remaining peripheral devices;

program code for deducing that the identifier for the docked wireless peripheral device is an identifier found in the first list but missing in the second list; and program code for subsequently establishing an exclusive wireless connection with the docked wireless peripheral device.

15. The computer program product of claim 14, wherein the transmission of the identification signal from the docked peripheral device is stopped in response to a turning off of a power to a battery re-charger for a battery in the docked peripheral device.

16. The computer program product of claim 14, wherein the peripheral device is capable of communicating with the computer system using a short-range wireless communication system.

17. The computer program product of claim 16, wherein the short-range wireless communication system is a Bluetooth® system.

18. The computer program product of claim 14, wherein the deducing step is performed by logically subtracting the contents of the second list from the contents of the first list.

19. The computer program product of claim 14, wherein the computer system is a tablet computer mounted on a shopping cart, and wherein the peripheral device is a scanner.

* * * * *